(12) United States Patent
Bai et al.

(10) Patent No.: US 11,874,672 B2
(45) Date of Patent: Jan. 16, 2024

(54) METHOD FOR ACTIVE DISTURBANCE REJECTION ROLL CONTROLLER OF VEHICLE UNDER DISTURBANCE OF COMPLEX SEA CONDITIONS

(71) Applicant: Harbin Institute of Technology, Heilongjiang (CN)

(72) Inventors: Yuliang Bai, Heilongjiang (CN);
Xiaogang Wang, Heilongjiang (CN);
Zichen Zhang, Heilongjiang (CN);
Shuai Wang, Heilongjiang (CN);
Yongzhi Shan, Heilongjiang (CN);
Tianfu Xu, Heilongjiang (CN);
Xiaoshuai Zhang, Heilongjiang (CN);
Jianming Guo, Heilongjiang (CN);
Yaxu Quan, Heilongjiang (CN);
Ligang Dong, Heilongjiang (CN)

(73) Assignee: Harbin Institute of Technology, Heilongjiang (CN)

( * ) Notice: Subject to any disclaimer, the term of this patent is extended or adjusted under 35 U.S.C. 154(b) by 0 days.

(21) Appl. No.: 17/845,313

(22) Filed: Jun. 21, 2022

(65) Prior Publication Data
US 2023/0101338 A1    Mar. 30, 2023

(30) Foreign Application Priority Data
Sep. 29, 2021   (CN) .......................... 202111149593.4

(51) Int. Cl.
*G05D 1/08*  (2006.01)

(52) U.S. Cl.
CPC .................................. *G05D 1/0875* (2013.01)

(58) Field of Classification Search
CPC .......... G05D 1/0875; G05D 1/02; G05D 1/10; Y02T 90/00; G01C 21/005; G06V 10/42; B63G 2008/004; B63G 2008/008
See application file for complete search history.

(56) References Cited

U.S. PATENT DOCUMENTS

| | | | |
|---|---|---|---|
| 2009/0228162 A1* | 9/2009 | Sanchez | B63B 79/10 701/21 |
| 2016/0334793 A1* | 11/2016 | Celikkol | B63G 8/001 |
| 2020/0372191 A1* | 11/2020 | Lindberg | G06F 17/18 |

FOREIGN PATENT DOCUMENTS

EP    3681792 B1 *  11/2022  ........... B63B 39/005

OTHER PUBLICATIONS

Huang, Jian, "Research on Application of ADRC in Roll Attitude Control of the Underwater Vehicles", Ship Engineering, 2014, 36/1, pp. 131-134.

(Continued)

*Primary Examiner* — Masud Ahmed
(74) *Attorney, Agent, or Firm* — GRUMBLES LAW PLLC; Brittany Haanan (57) ABSTRACT

The present disclosure provides a design method for an active disturbance rejection roll controller of a vehicle under disturbance of complex sea conditions, including: step 1: establishing a vehicle roll attitude control model; step 2: designing an active disturbance rejection controller (ADRC) on the basis of the control model in step 1 and a pole placement method; and step 3: performing an active disturbance rejection roll control by using the active disturbance rejection controller in step 2. The present disclosure solves the problem of a stable control of the vehicle under the disturbance of the complex sea conditions.

1 Claim, 11 Drawing Sheets

(56) References Cited

OTHER PUBLICATIONS

Notice of Allowance pertaining to Chinese Patent Application No. 202111149593.4, dated Jun. 24, 2022.
Office Action pertaining to corresponding Chinese Patent Application No. 202111149593.4, dated Apr. 8, 2022.

* cited by examiner

Offset=0

METHOD FOR ACTIVE DISTURBANCE REJECTION ROLL CONTROLLER OF VEHICLE UNDER DISTURBANCE OF COMPLEX SEA CONDITIONS

CROSS REFERENCE TO RELATED APPLICATION

This patent application claims the benefit and priority of Chinese Patent Application No. 202111149593.4, entitled "DESIGN METHOD FOR ACTIVE DISTURBANCE REJECTION ROLL CONTROLLER OF VEHICLE UNDER DISTURBANCE OF COMPLEX SEA CONDITIONS" filed on Sep. 29, 2021, the disclosure of which is incorporated by reference herein in its entirety as part of the present application.

TECHNICAL FIELD

The present disclosure relates to the field of vehicle control, and specifically to a design method for an active disturbance rejection roll controller of a vehicle under disturbance of complex sea conditions.

BACKGROUND ART

At present, for the problem of roll control of the vehicle under the disturbance of the complex sea conditions, the performance of a proportional-integral-derivative (PID) controller deteriorates and does not meet requirements of use under extreme operating conditions. Moreover, in a nonlinear control method adopted, some controllers depend on a specific model of disturbance, and some controllers have more cumbersome design methods, thereby being not conducive to engineering implementation. The present disclosure designs a linear extended state observer, and adopts a relatively simple and effective parameter setting method, so that the vehicle has good control performance under the action of strong external disturbance.

SUMMARY

The present disclosure provides a design method for an active disturbance rejection roll controller of a vehicle under disturbance of complex sea conditions, solving a problem of stable control of the vehicle under the disturbance of the complex sea conditions.

The present disclosure is implemented by the following technical solutions:

A design method for an active disturbance rejection roll controller of a vehicle under disturbance of complex sea conditions, where an active disturbance rejection roll control method for the vehicle includes the following steps:

step 1: establishing a vehicle roll attitude control model;
step 2: designing an active disturbance rejection controller (ADRC) on the basis of the control model in step 1 and a pole placement method; and
step 3: performing an active disturbance rejection roll control by using the active disturbance rejection controller in step 2.

Furthermore, in step 1, according to a theorem of momentum and moment of momentum, an equation of the roll motion is obtained as follows:

$$\begin{cases} J_x \dot{w}_x + (J_z - J_y)w_y w_x = A_{m_x}^\beta v^2 \beta - A_{m_x}^\delta v^2 \delta_d - A_{m_x}^w v^2 w_x + A_{m_{xp}} v^2 - \lambda_{44} \dot{w}_x - \\ \qquad B(z_b \cos\varphi + h \sin\varphi)\cos\theta + M_d \\ \varphi = w_x - (w_y \cos\varphi - w_z \sin\varphi)\tan\theta \\ \cos\Theta\sin\Phi = \cos\beta\cos\theta\sin\varphi - \sin\alpha\sin\beta\cos\theta\cos\varphi + \cos\alpha\sin\beta\sin\theta \end{cases} \quad (1)$$

where, a simplifying assumption is made on the equation according to a typical trajectory, that is, the equation is simplified under three conditions of linearization, horizontal straight trajectory and axial symmetry of the vehicle, and the simplified equation of the roll motion is as follows:

$$(J_x + \lambda_{44})\frac{dw_x}{dt} + \frac{1}{2}\rho v^2 SL m_x^{wx} w_{x_1} = \frac{1}{2}\rho v^2 SL m_x^{\delta_d}\delta_d + M_d \quad (2)$$

where, $J_x$ is a moment of inertia of the vehicle along an x axis, $\lambda_{44}$ is additional mass of the vehicle along the x axis, $\rho$ is density of an environment where the vehicle is located, $v$ is a velocity of the vehicle, $S$ is a characteristic area of the vehicle, $L$ is a characteristic length of the vehicle, $m_x^{wx}$ is a roll moment damping constant of the vehicle, $w_x$ is an angular velocity in roll of the vehicle, $m_x^{\delta_d}$ is a relative derivative of a roll control moment of the vehicle, $\delta_d$ is an equivalent roll rudder deflection angle of the vehicle, and $M_d$ is a disturbance moment caused by the complex sea conditions around the vehicle; and a transfer function of a roll angle to a roll rudder deflection angle is as follows:

$$G_\varphi(s) = \frac{\frac{1}{2}\rho v^2 SL m_x^{\delta_d}}{(J_x + \lambda_{44})s - \frac{1}{2}\rho v^2 SL m_x^{wx}} \cdot \frac{1}{s} \quad (3)$$

Furthermore, designing the active disturbance rejection controller in step 2 specifically includes:

step 2.1: designing a linear extended state observer (LESO) without an object model;
step 2.2: designing a linear state error feedback (LSEF) controller;
step 2.3: performing a simulation analysis on the LESO in step 2.1 and the LSEF controller in step 2.2; and
step 2.4: verifying performance of the active disturbance rejection controller (ADRC).

Furthermore, in step 2.1, with making y→φ and w representing total disturbance, a vehicle roll control system is described as follows:

$$\ddot{y} = a_1\dot{y} - a_0 y + w + bu \quad (4)$$

where, y is a roll angle, $\dot{y}$ is an angular velocity in roll, $\ddot{y}$ is an acceleration of the roll angle, u is an input of control quantity, b is a relative coefficient of control, $a_0$ is a relative coefficient of the roll angle, and $a_1$ is a relative coefficient of the angular velocity in roll;

the total disturbance is set as follows:

$$f(y, \dot{y}, w, t) = -a_1\dot{y} - a_0 y + w + (b-b_0)u \quad (5)$$

formula (5) is rewritten as follows:

$$\ddot{y} = f + b_0 u \quad (6)$$

by setting state variables as follows: $x_1 = y$, $x_2 = \dot{y}$, and $x_3 = f$, a continuous extended state observer is obtained as follows:

$$\dot{x} = Ax + Bu + E\dot{f} \quad (7)$$

where, $$A = \begin{bmatrix} 0 & 1 & 0 \\ 0 & 0 & 1 \\ 0 & 0 & 0 \end{bmatrix}, B = \begin{bmatrix} 0 \\ b_0 \\ 0 \end{bmatrix}, \text{ and } E = \begin{bmatrix} 0 \\ 0 \\ 1 \end{bmatrix};$$

a corresponding LESO is:

$$\begin{cases} \dot{z} = Ax + Bu + L(y - \hat{y}) \\ \hat{y} = Cz \end{cases} \quad (8)$$

where, $C=[1\ 0\ 0]$, and $L=[L_1\ L_2\ L_3]^T$ is an error feedback control gain matrix of the observer;

a characteristic equation of the formula is:

$$\lambda(s)=|sI-(A-LC)| \quad (9)$$

after parameterization, a pole of the characteristic equation is designed as follows:

$$\lambda(s)=(s+w_0)(s+k_0w_0)(s+k_2w_0) \quad (10)$$

where, $w_0$ is a pole of a designed extended state observer, and $k_1$ and $k_2$ are pole placement coefficients of the extended state observer; and a gain matrix of the extended state observer is obtained as follows:

$$L = \begin{bmatrix} (k_1 + k_2 + 1)w_0 \\ (k_1 + k_2 + k_1k_2)w_0^2 \\ (k_1k_2)w_0^3 \end{bmatrix} \quad (11)$$

Furthermore, in step 2.2, the LSEF adopts a controller of a linear proportional and derivative (PD) combination, $z_1 \rightarrow y$, $z_2 \rightarrow \dot{y}$; and a form of the controller is:

$$u_0 = k_p(z_c - z_1) - k_d z_2 \quad (12)$$

where, $u_0$ is final control output, $z_c$ is an expected roll angle, $z_1$ is a roll angle of the vehicle in a current state, and $z_2$ is a roll angular velocity of the vehicle in the current state;

a closed-loop transfer function is:

$$G(s) = \frac{k_p}{s^2 + k_d s + k_p} \quad (13)$$

where, $k_p$ and $k_d$ are controller parameters needing to be designed, and, by selecting the pole of the transfer function of the controller and placing the pole at different positions $w_c$, and $k_3 w_c$, $w_c > 1$, $k_3 > 1$, the controller parameters are obtained as follows:

$$k_p = k_3 w_c^2$$

$$k_d = (k_3 + 1)w_c \quad (14)$$

after parametric design, six parameters to be adjusted in the ADRC are $w_0$, $w_c$, $b_0$, $k_1$, $k_2$, $k_3$, where $w_0$ is the pole of the extended state observer, $w_c$ is a pole of the controller, $b_0$ is a control coefficient, $k_1$ and $k_2$ are the pole placement coefficients of the extended state observer, and $k_3$ is a pole placement coefficient of the controller.

The present disclosure has the following beneficial effects:

The active disturbance rejection controller under the complex sea conditions of the present disclosure has better control performance, quick response time, high control precision and good robustness, and may stably control a roll channel of the vehicle under unknown disturbance.

The linear extended state observer of the present disclosure does not depend on a specific control model, has short convergence time and stable control performance, and may perform model compensation within a short time.

The linear extended state observer of the present disclosure has better control performance, simple structure, remarkable effects, and strong operability for parameter setting, and it is easy to be achieved.

DETAILED DESCRIPTION OF THE EMBODIMENTS

The technical solutions in the embodiments of the present disclosure are clearly and completely described below with reference to the accompanying drawings in the embodiments of the present disclosure. Apparently, the described embodiments are merely some rather than all of the embodiments of the present disclosure. On the basis of the embodiments of the present disclosure, all other embodiments derived by a person of ordinary skill in the art, without involving any creative effort, fall within the scope of protection of the present disclosure.

An active disturbance rejection roll control method for a vehicle under disturbance of complex sea conditions includes the following steps:

step 1: establishing a vehicle roll attitude control model;

step 2: designing an active disturbance rejection controller (ADRC) on the basis of the control model in step 1 and a pole placement method; and step 3: performing an active disturbance rejection roll control by using the active disturbance rejection controller in step 2.

Furthermore, in step 1, according to a theorem of momentum and moment of momentum, an equation of the roll motion is obtained as follows:

$$\begin{cases} J_x \dot{w}_x + (J_z - J_y) w_y w_x = A_{m_x}^{\beta} v^2 \beta - A_{m_x}^{\delta} v^2 \delta_d - A_{m_x}^{w} v^2 w_x + A_{m_{xp}} v^2 - \lambda_{44} \dot{w}_x - \\ \qquad B(z_b \cos \varphi + h \sin \varphi) \cos \theta + M_d \\ \varphi = w_x - (w_y \cos \varphi - w_z \sin \varphi) \tan \theta \\ \cos \Theta \sin \Phi = \cos \beta \cos \theta \sin \varphi - \sin \alpha \sin \beta \cos \theta \cos \varphi + \cos \alpha \sin \beta \sin \theta \end{cases} \quad (1)$$

where, a simplifying assumption is made on the equation according to a typical trajectory, that is, the equation is simplified under three conditions of linearization, horizontal straight trajectory and axial symmetry of the vehicle, and the simplified equation of the roll motion is as follows:

$$(J_x + \lambda_{44}) \frac{dw_x}{dt} + \frac{1}{2} \rho v^2 S L m_x^{w_x} w_{x_1} = \frac{1}{2} \rho v^2 S L m_x^{\delta_d} \delta_d + M_d \quad (2)$$

where, $J_x$ is a moment of inertia of the vehicle along an x axis, $\delta_{44}$ is additional mass of the vehicle along the x axis, $\rho$ is density of an environment where the vehicle is located, v is a velocity of the vehicle, S is a characteristic area of the vehicle, L is a characteristic length of the vehicle, $m_x^{wx}$ is roll moment damping constant of the vehicle, $w_x$ is an angular velocity in roll of the vehicle, $m_x^{\delta_d}$ is a relative derivative of a roll control moment of the vehicle, $\delta_d$ is an equivalent roll rudder deflection angle of the vehicle, and $M_d$ is a disturbance moment caused by the complex sea conditions around the vehicle.

To study an individual roll motion, the simplifying assumption is made according to the typical trajectory:

(1) the equation is linearized by a small-angle assumption;

(2) the horizontal straight trajectory is considered; and (3) the vehicle is axisymmetric, a propeller is balanced, and a center of gravity is not shifted.

A transfer function of a roll angle to a roll rudder deflection angle is as follows:

$$G_{\varphi}(s) = \frac{\frac{1}{2} \rho v^2 S L m_x^{\delta_d}}{(J_x + \lambda_{44})s - \frac{1}{2} \rho v^2 S L m_x^{w_x}} \frac{1}{s} \quad (3)$$

Furthermore, the design of the active disturbance rejection controller in step 2 specifically includes the following steps:

step 2.1: designing a linear extended state observer (LESO) without an object model;

step 2.2: designing a linear state error feedback (LSEF) controller;

step 2.3: performing a simulation analysis on the LESO in step 2.1 and the LSEF controller in step 2.2; and step 2.4: verifying performance of the active disturbance rejection controller (ADRC).

Furthermore, in step 2.1, with making y→φ and w representing total disturbance, a vehicle roll control system is described as follows:

$$\ddot{y} = a_1 \dot{y} - a_0 y + w + bu \quad (4)$$

where, y is a roll angle, $\dot{y}$ is an angular velocity in roll, $\ddot{y}$ is an acceleration of the roll angle, u is an input of control quantity, b is a relative coefficient of control, $a_0$ is a relative coefficient of the roll angle, and $a_1$ is a relative coefficient of the angular velocity in roll.

The total disturbance is set as follows:

$$f(y, \dot{y}, w, t) = -a_1 \dot{y} - a_0 y + w + (b - b_0) u \quad (5)$$

Formula (5) is rewritten as follows:

$$\ddot{y} = f + b_0 u \quad (6)$$

By setting state variables as follows: $x_1 = y$, $x_2 = \dot{y}$, and $x_3 = f$, a continuous extended state observer is obtained as follows:

$$\dot{x} = Ax + Bu + E\dot{f} \quad (7)$$

$$A = \begin{bmatrix} 0 & 1 & 0 \\ 0 & 0 & 1 \\ 0 & 0 & 0 \end{bmatrix}, B = \begin{bmatrix} 0 \\ b_0 \\ 0 \end{bmatrix}, \text{ and } E = \begin{bmatrix} 0 \\ 0 \\ 1 \end{bmatrix}.$$

where,

The corresponding LESO is:

$$\begin{cases} \dot{z} = Ax + Bu + L(y - \hat{y}) \\ \hat{y} = Cz \end{cases} \quad (8)$$

where, C=[1 0 0], and $L=[L_1 L_2 L_3]^T$ is an error feedback control gain matrix of the observer.

A characteristic equation of the formula is:

$$\lambda(s) = |sI - (A - LC)| \quad (9)$$

After parameterization, a pole of the characteristic equation is designed as follows:

$$\lambda(s) = (s + w_0)(s + k_0 w_0)(s + k_2 w_0) \quad (10)$$

where, $w_0$ is a pole of a designed extended state observer, and $k_1$ and $k_2$ are pole placement coefficients of the extended state observer; and a gain matrix of the extended state observer is obtained as follows:

$$L = \begin{bmatrix} (k_1 + k_2 + 1) w_0 \\ (k_1 + k_2 + k_1 k_2) w_0^2 \\ (k_1 k_2) w_0^3 \end{bmatrix} \quad (11)$$

and derivative (PD) combination with the following form, $z_1 \to y$, $z_2 \to \dot{y}$; and the control law is:

$$u_0 = k_p(z_c - z_1) - k_d z_2 \quad (12)$$

where $u_0$ is a final control output, $z_c$ is an expected roll angle, $z_1$ is a roll angle of the vehicle in a current state, and $z_2$ is an angular velocity in roll of the vehicle in the current state;

a closed-loop transfer function is:

$$G(s) = \frac{k_p}{s^2 + k_d s + k_p} \quad (13)$$

where $k_p$ and $k_d$ are controller parameters needing to be designed, and, by selecting the pole of the transfer function of the controller and placing the pole at different positions $w_c$ and $k_3 w_c$, $w_c > 1$, $k_3 > 1$, the controller parameters are obtained as follows:

$$k_p = k_3 w_c^2$$

$$k_d = (k_3 + 1) w_c \quad (14)$$

After parametric design, the ADRC has six parameters to be adjusted, namely $w_0$, $w_c$, $b_0$, $k_1$, $k_2$, $k_3$, where $w_0$ is the pole of the extended state observer, $w_c$ is a pole of the controller, $b_0$ is a control coefficient, $k_1$ and $k_2$ are the pole placement coefficients of the extended state observer, and $k_3$ is a pole placement coefficient of the controller.

The active disturbance rejection controller and the PID controller are respectively configured to perform simulation, and an amplitude of the roll angle is set to be ±20°.

Figure 1:
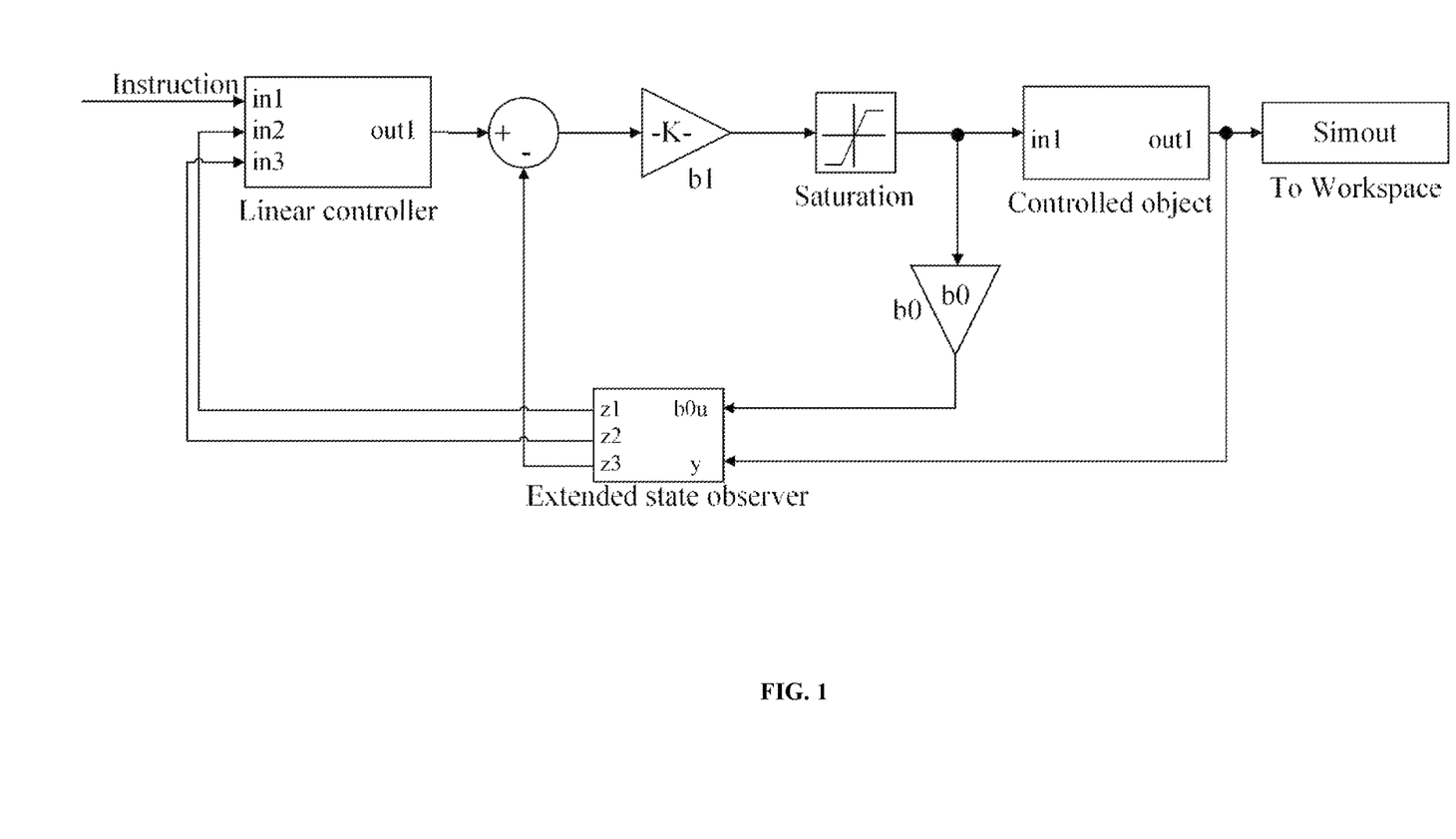
FIG. 1 is a schematic structural diagram of an ADRC in the present disclosure.
Figure 2:
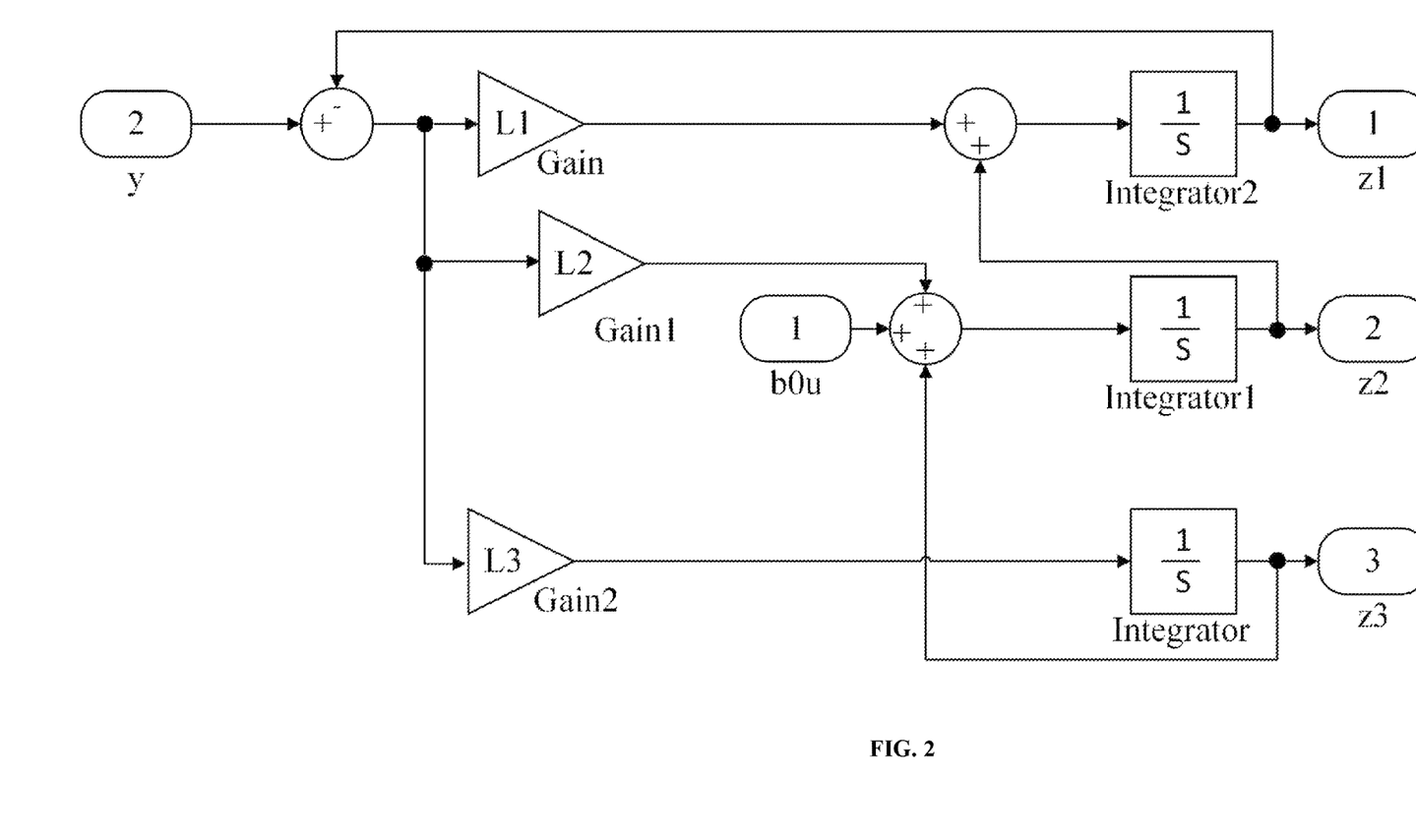
FIG. 2 is a schematic structural diagram of an extended state observer in the present disclosure.
Figure 3:
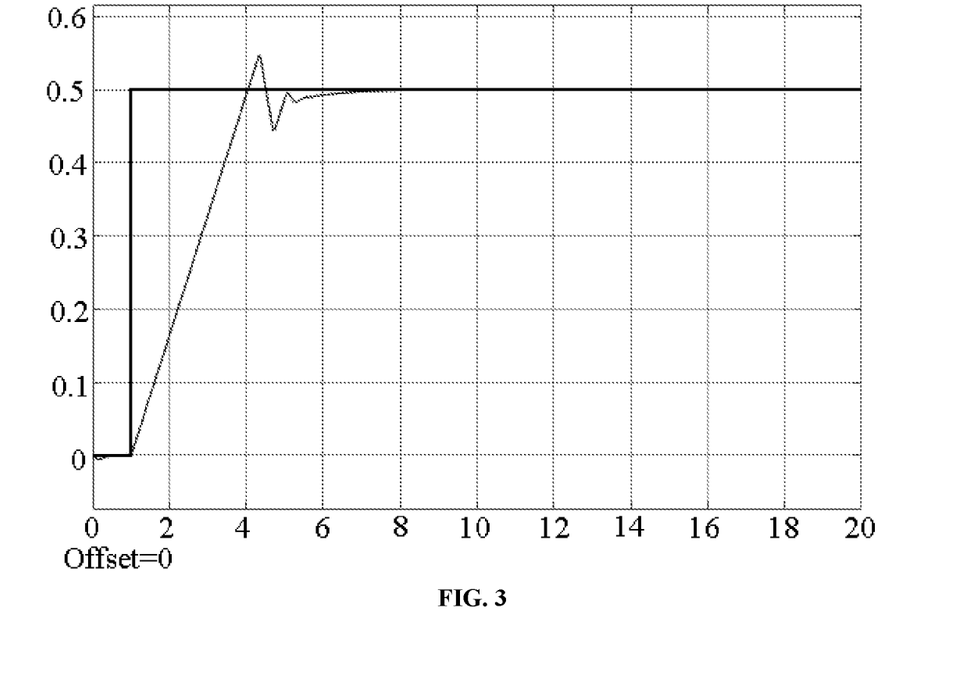
FIG. 3 is a graph of ADRC output with an input signal as a unit step signal and an external disturbance as a constant disturbance in the present disclosure.
Figure 4:
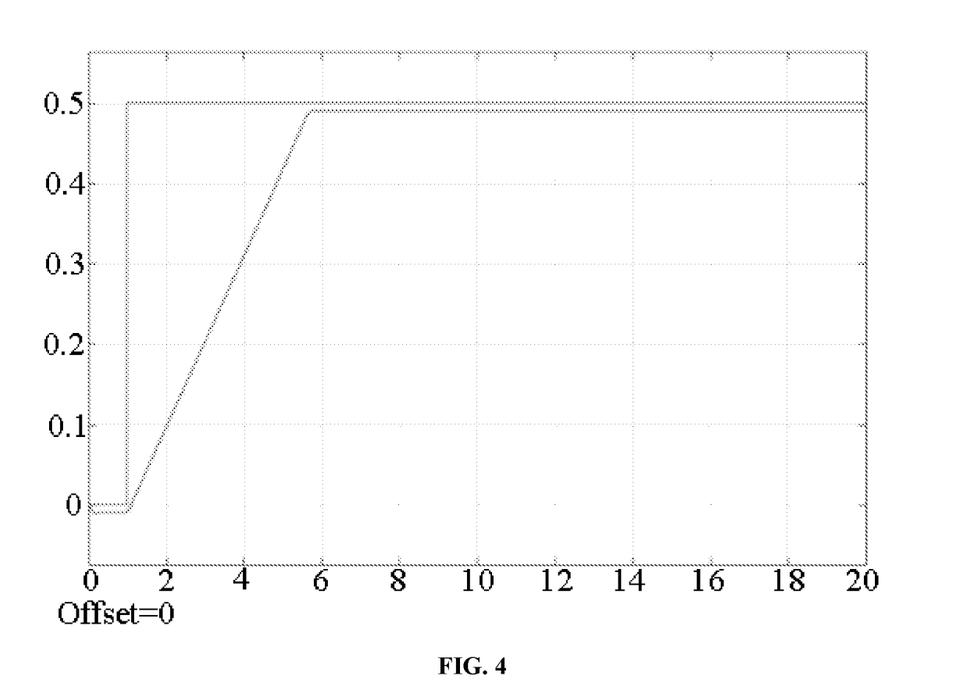
FIG. 4 is a graph of PID output with an input signal as a unit step signal and an external disturbance as a constant disturbance in the present disclosure.
Figure 5:
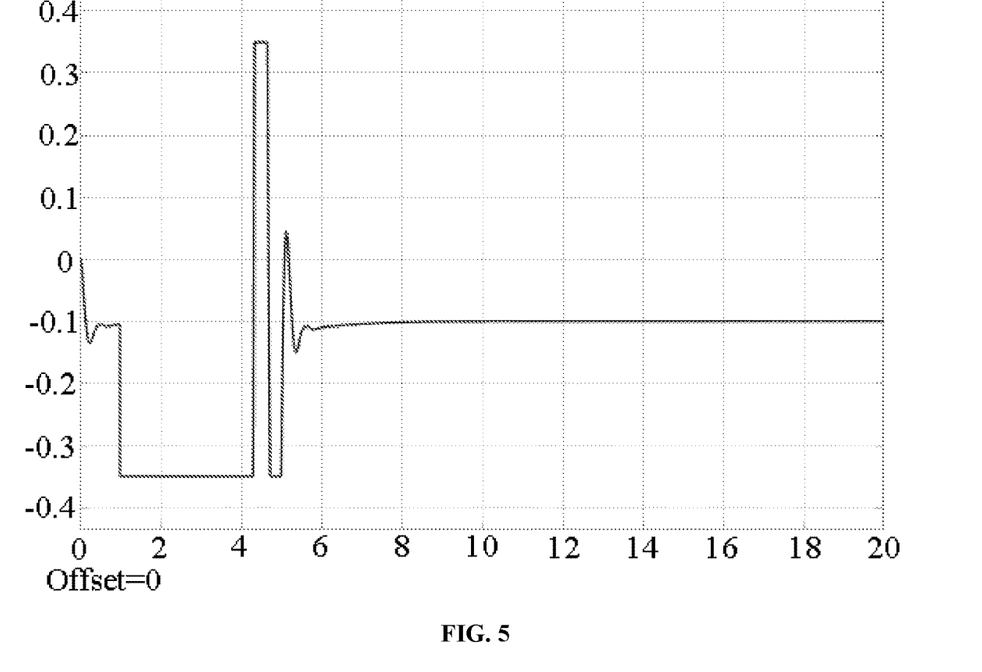
FIG. 5 is a graph of ADRC rudder deflection angle with an input signal as a unit step signal and an external disturbance as a constant disturbance in the present disclosure.
Figure 6:
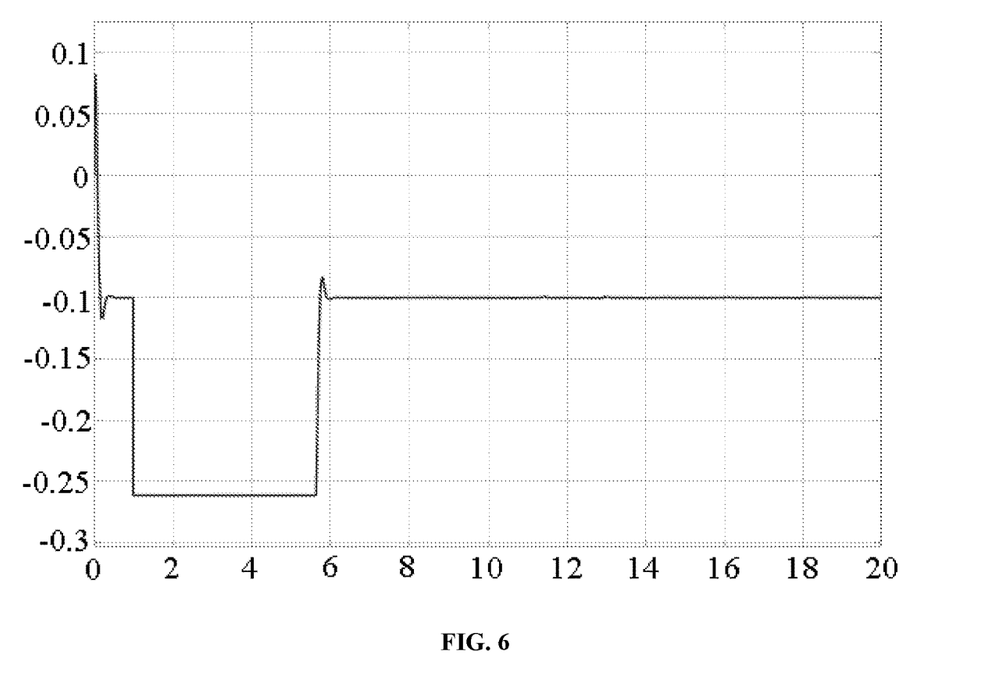
FIG. 6 is a graph of PID rudder deflection angle with an input signal as a unit step signal and an external disturbance as a constant disturbance in the present disclosure.

An input signal is a unit step signal, and an external disturbance is a constant disturbance.

It can be seen from curves in FIG. 3 to FIG. 6 that an ADRC step response signal converges faster and has no constant error, while a PID converges for a longer time and finally has a constant error, but in general, a difference between control effects of the two is small under this operating condition.

Figure 7:
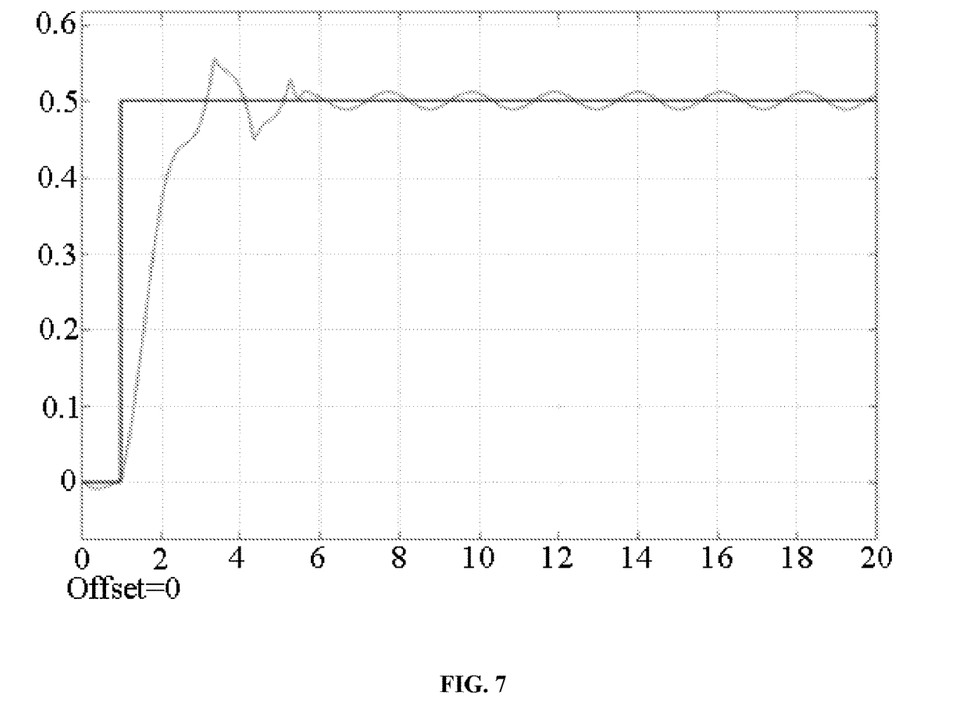
FIG. 7 is a graph of ADRC output with an input signal as a unit step signal and an external disturbance as a periodic disturbance in the present disclosure.
Figure 8:
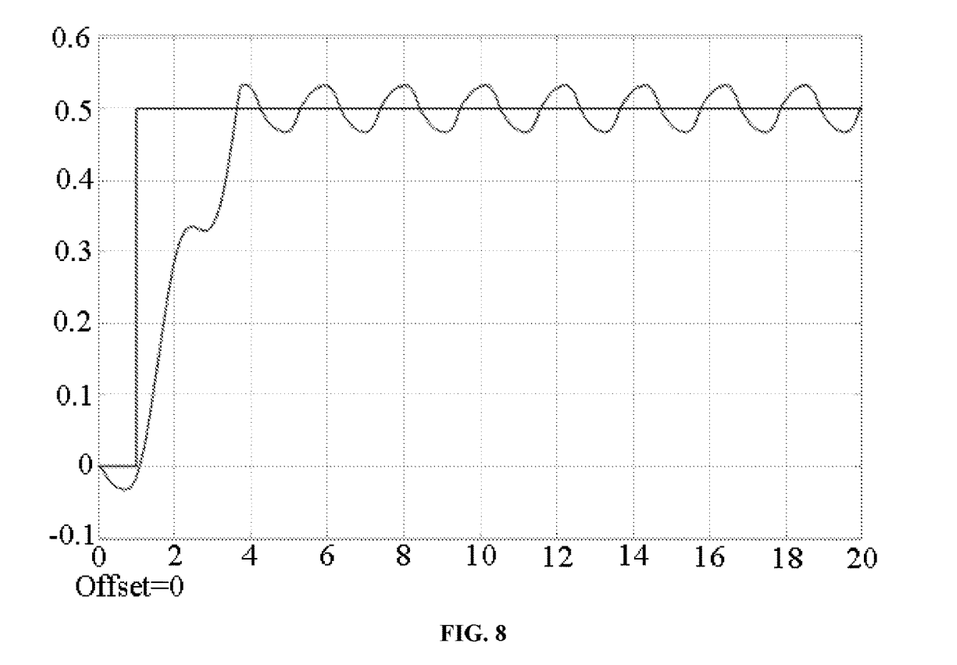
FIG. 8 is a graph of PID output with an input signal as a unit step signal and an external disturbance as a periodic disturbance in the present disclosure.
Figure 9:
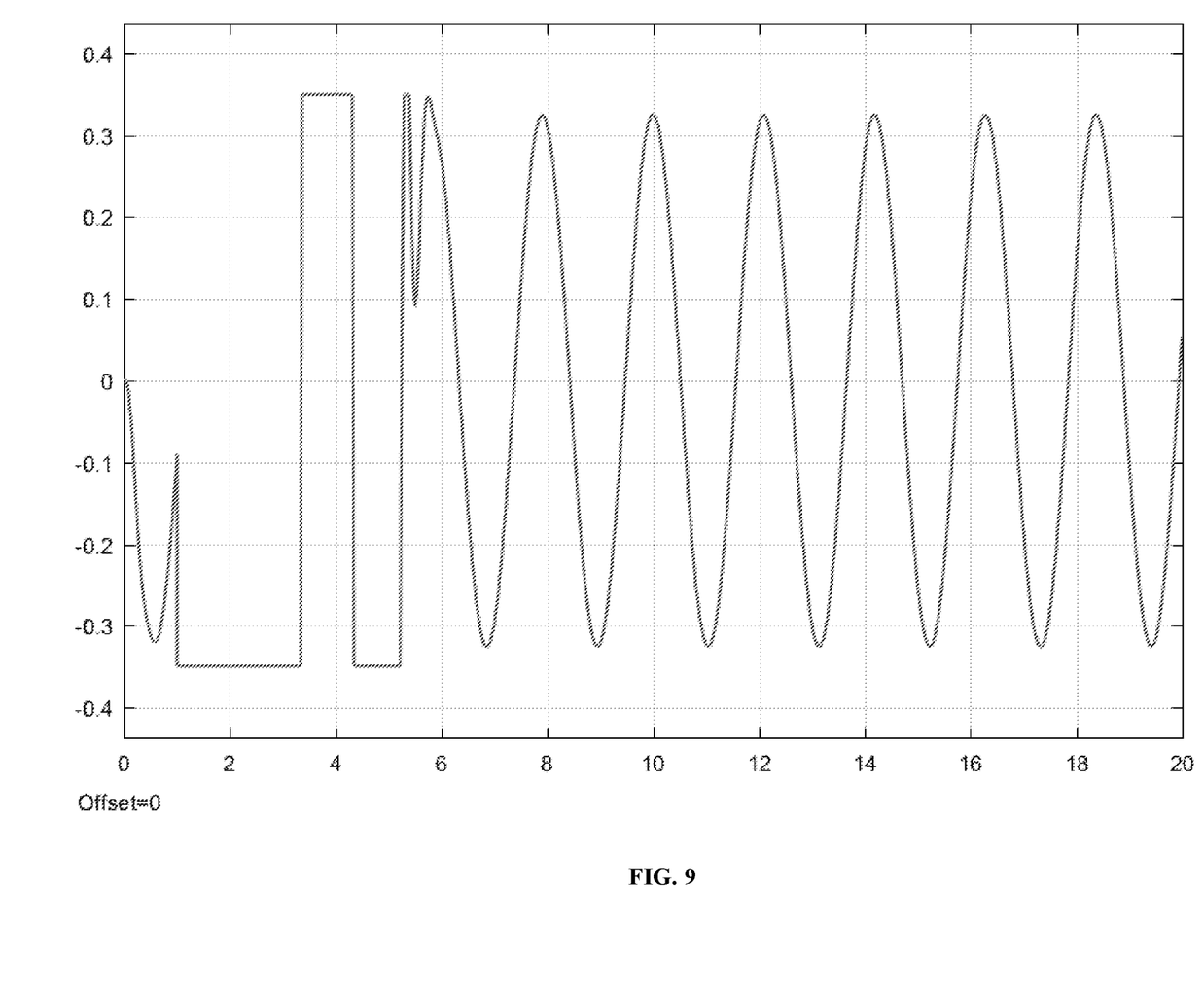
FIG. 9 is a graph of ADRC rudder deflection angle with an input signal as a unit step signal and an external disturbance as a periodic disturbance in the present disclosure.
Figure 10:
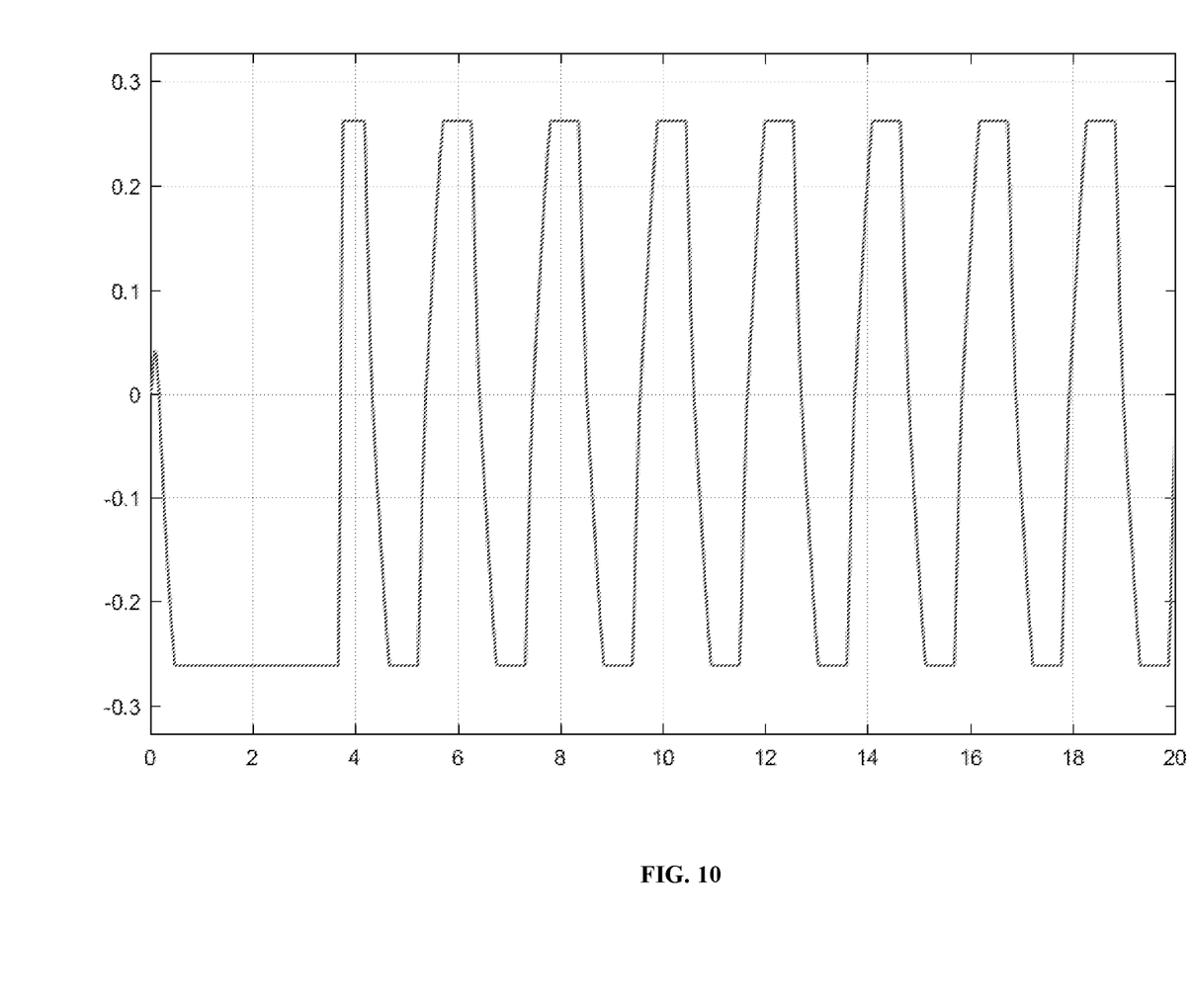
FIG. 10 is a graph of PID rudder deflection angle with an input signal as a unit step signal and an external disturbance as a periodic disturbance in the present disclosure.

The input signal is a unit step signal, and the external disturbance is a periodic disturbance.

It can be seen from curves in FIG. 7 to FIG. 10 that under the periodic disturbance, the ADRC step response signal converges faster, and final error convergence is smaller, while the PID controller has a larger tracking error.

Figure 11:
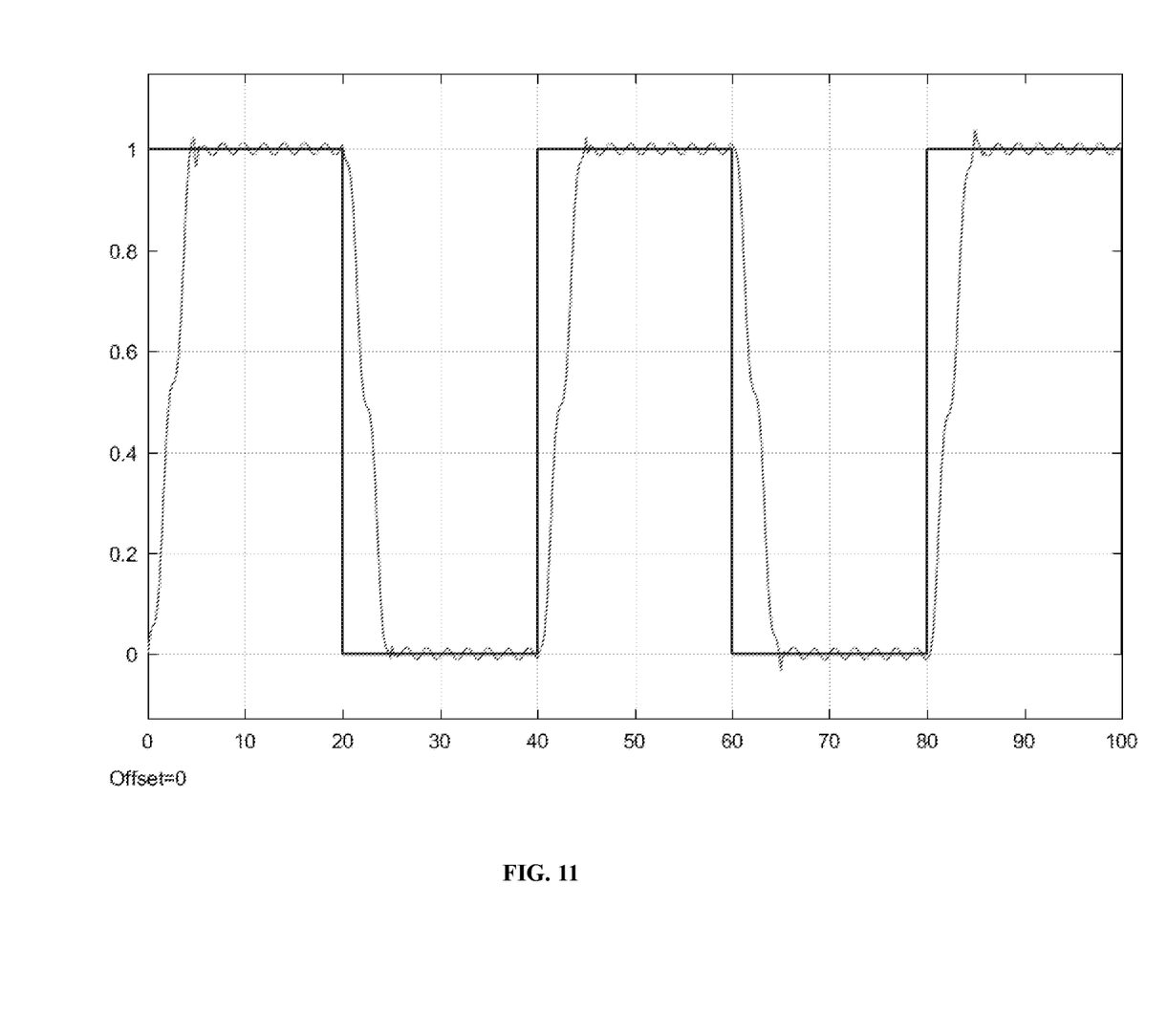
FIG. 11 is a graph of ADRC output with an input signal as a square signal and an external disturbance as a periodic disturbance in the present disclosure.
Figure 12:
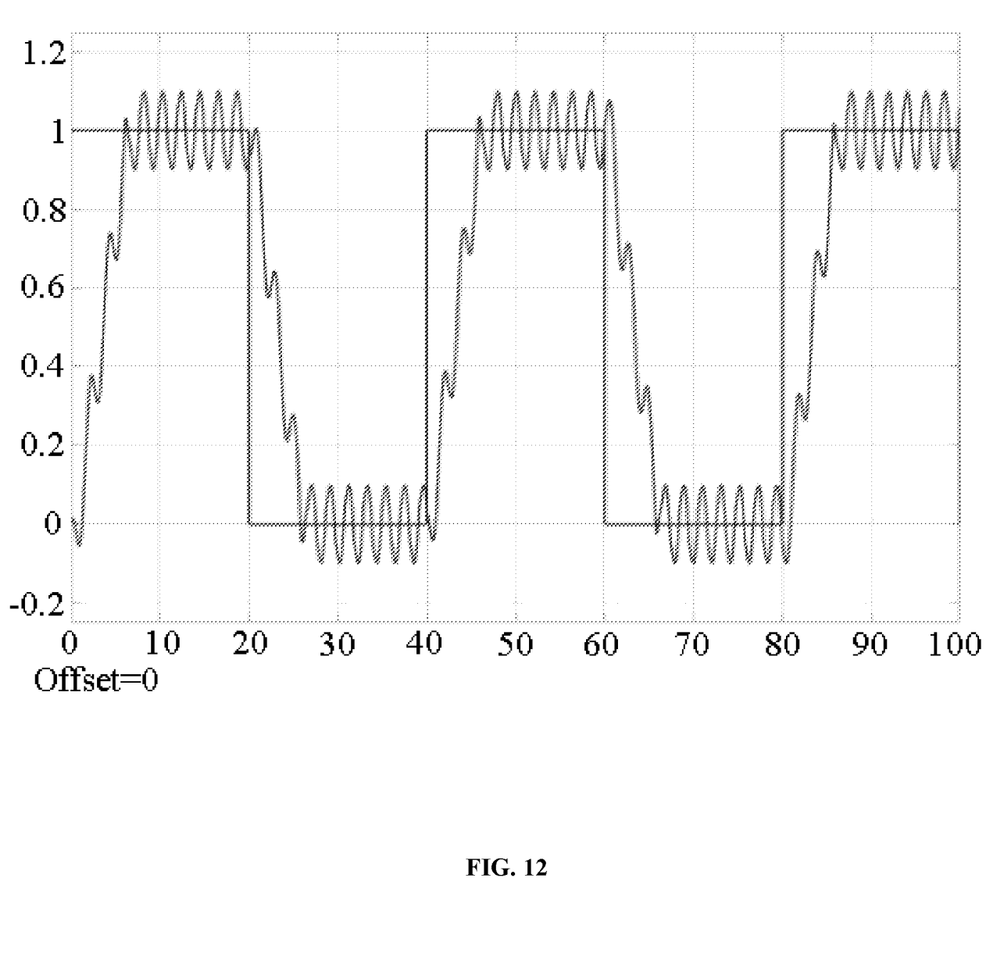
FIG. 12 is a graph of PID output with an input signal as a square signal and an external disturbance as a periodic disturbance in the present disclosure.
Figure 13:
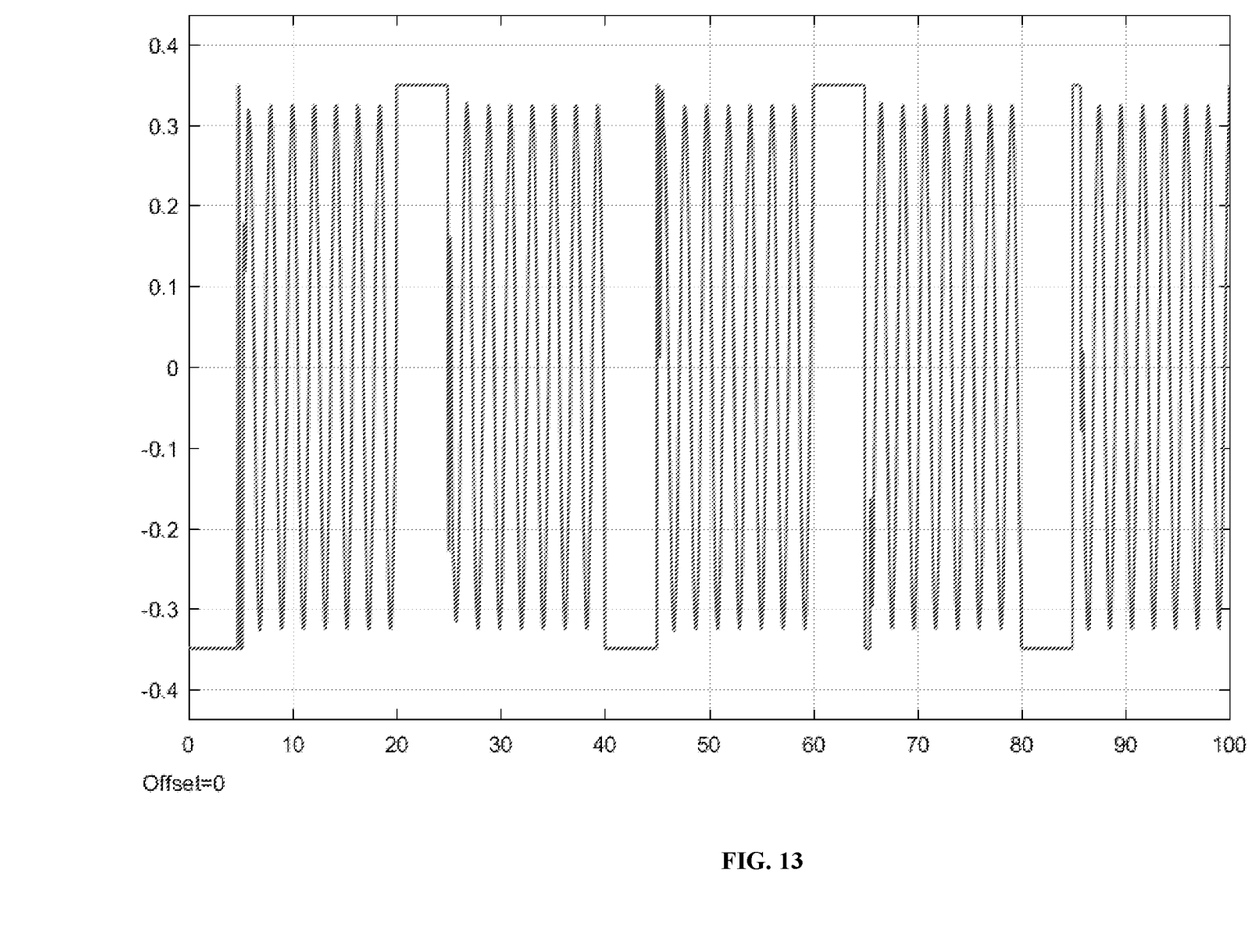
FIG. 13 is a graph of ADRC rudder deflection angle with an input signal as a square signal and an external disturbance as a periodic disturbance in the present disclosure.
Figure 14:
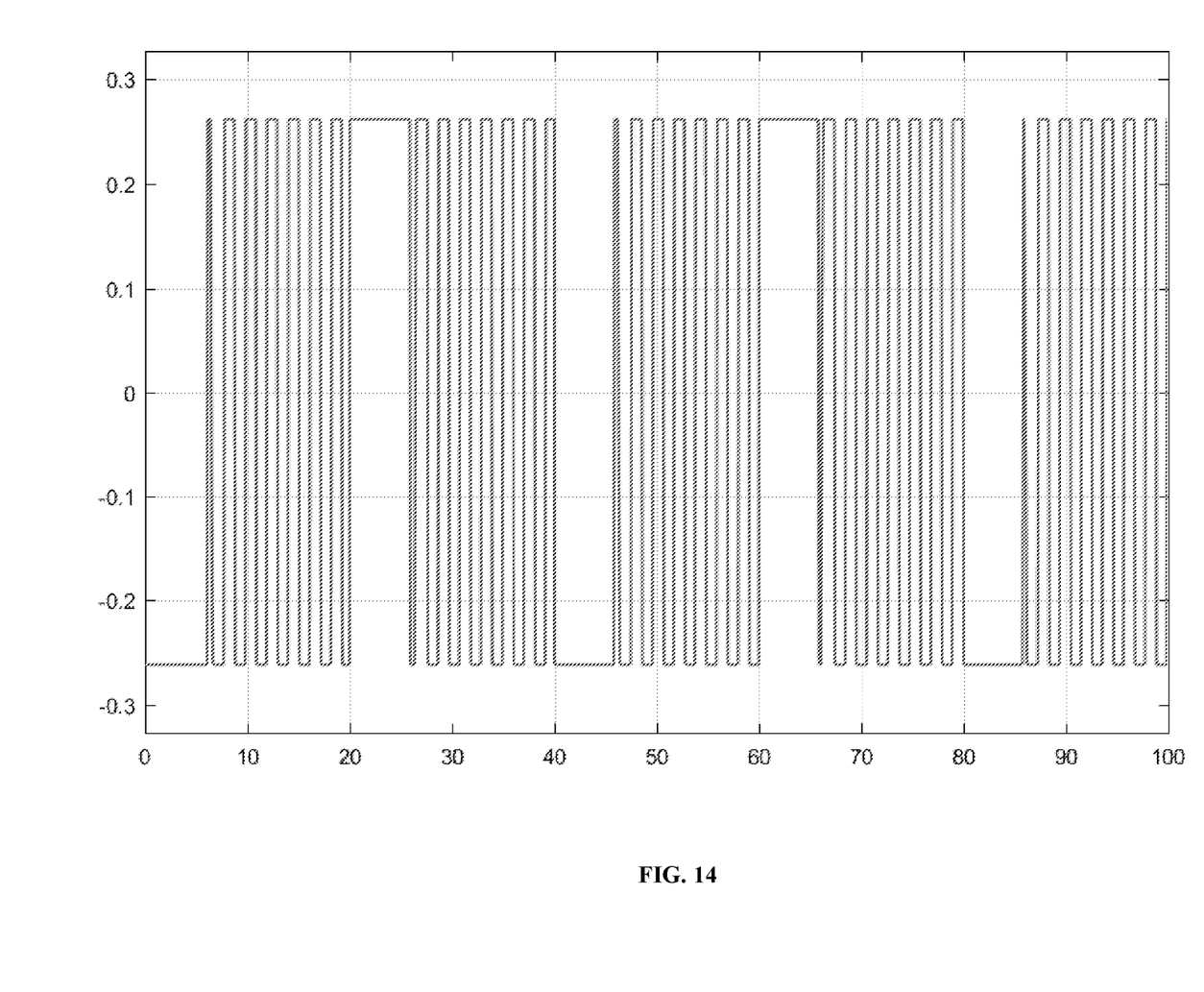
FIG. 14 is a graph of PID rudder deflection angle with an input signal as a square signal and an external disturbance as a periodic disturbance in the present disclosure.

The input signal is a square signal, and the external disturbance is the periodic disturbance.

It can be seen from curves in FIG. 11 to FIG. 14 that under the periodic disturbance, a tracking error of the ADRC with respect to a periodic square signal is smaller and finally converges, while the PID controller has a larger tracking error.

The invention claimed is:

1. A method for controlling a vehicle using an active disturbance rejection roll controller under disturbance of complex sea conditions, the method comprising:

step 1: acquiring a plurality of parameters of the vehicle, the plurality of parameters comprising a moment of inertia of the vehicle along an x axis, additional mass of the vehicle along the x axis, density of an environment where the vehicle is located, a velocity of the vehicle, a characteristic area of the vehicle, a characteristic length of the vehicle, a roll moment damping constant of the vehicle, an angular velocity in roll of the vehicle, a relative derivative of a roll control moment of the vehicle, an equivalent roll rudder deflection angle of the vehicle, and a disturbance moment caused by the complex sea conditions around the vehicle;

step 2: establishing a vehicle roll attitude control model based on the plurality of parameters;

step 3: designing an active disturbance rejection controller (LADRC) on the basis of the control model in step 2 and a pole placement method; and step 4: controlling the vehicle by using the active disturbance rejection controller in step 3, wherein in step 2, according to a theorem of momentum and moment of momentum, an equation of the roll motion is obtained as follows:

$$\begin{cases} J_x \dot{w}_x + (J_z - J_y) w_y w_x = A_{m_x}^\beta v^2 \beta - A_{m_x}^\delta v^2 \delta_d - A_{m_x}^w v^2 w_x + A_{m_{xp}} v^2 - \lambda_{44} \dot{w}_x - \\ \qquad B(z_b \cos \varphi + h \sin \varphi) \cos \theta + M_d \\ \varphi = w_x - (w_y \cos \varphi - w_z \sin \varphi) \tan \theta \\ \cos \Theta \sin \Phi = \cos \beta \cos \theta \sin \varphi - \sin \alpha \sin \beta \cos \theta \cos \varphi + \cos \alpha \sin \beta \sin \theta \end{cases} \quad (1)$$

wherein, a simplifying assumption is made on the equation according to a typical trajectory, that is, the equation is simplified under three conditions of linearization, horizontal straight trajectory and axial symmetry of the vehicle, and the simplified equation of roll motion is as follows:

$$(J_x + \lambda_{44}) \frac{dw_x}{dt} + \frac{1}{2} \rho v^2 SL m_x^{wx} w_{x_1} = \frac{1}{2} \rho v^2 SL m_x^{\delta_d} \delta_d + M_d \quad (2)$$

where $J_x$ is the moment of inertia of the vehicle along the x axis, $\lambda_{44}$ is the additional mass of the vehicle along the x axis, $\rho$ is the density of the environment where the vehicle is located, $v$ is the velocity of the vehicle, $S$ is the characteristic area of the vehicle, $L$ is the characteristic length of the vehicle, $m_x^{wx}$ is the roll moment damping constant of the vehicle, $w_x$ is the angular velocity in roll of the vehicle, $m_x^{\delta_d}$ is the relative derivative of the roll control moment of the vehicle, $\delta_d$ is the equivalent roll rudder deflection angle of the vehicle, and $M_d$ is the disturbance moment caused by the complex sea conditions around the vehicle; and a transfer function of a roll angle to a roll rudder deflection angle is as follows:

$$G_\varphi(s) = \frac{\frac{1}{2} \rho v^2 SL m_x^{\delta_d}}{(J_x + \lambda_{44})s - \frac{1}{2} \rho v^2 SL m_x^{wx}} \cdot \frac{1}{s}; \quad (3)$$

in step 3, designing the active disturbance rejection controller comprises:

step 3.1: designing a linear extended state observer (LESO) without an object model;

step 3.2: designing a linear state error feedback (LSEF) controller;

step 3.3: performing a simulation analysis on the LESO in step 3.1 and the LSEF controller in step 3.2; and step 3.4: verifying performance of the active disturbance rejection controller (LADRC);

in step 3.1, with making $y \to \varphi$ and w representing total disturbance, a vehicle roll control system is described as follows:

$$\ddot{y} = -a_1\dot{y} - a_0 y + w + bu \quad (4)$$

wherein, y is a roll angle, $\dot{y}$ is an angular velocity in roll, $\ddot{y}$ is an acceleration of the roll angle, u is an input of control quantity, b is a relative coefficient of control, $a_0$ is a relative coefficient of the roll angle, and $a_1$ is a relative coefficient of the angular velocity in roll;

the total disturbance is set as follows:

$$f(y, \dot{y}, w, t) = -a_1\dot{y} - a_0 y + w + (b - b_0)u \quad (5)$$

formula (4) is rewritten as follows:

$$\ddot{y} = f + b_0 u \quad (6)$$

by setting state variables as follows: $x_1 = y$, $x_2 = \dot{y}$, and $x_3 = f$, a continuous extended state observer is obtained as follows:

$$\dot{x} = Ax + Bu + E\dot{f} \quad (7)$$

$$A = \begin{bmatrix} 0 & 1 & 0 \\ 0 & 0 & 1 \\ 0 & 0 & 0 \end{bmatrix}, B = \begin{bmatrix} 0 \\ b_0 \\ 0 \end{bmatrix}, \text{ and } E = \begin{bmatrix} 0 \\ 0 \\ 1 \end{bmatrix};$$

wherein, a corresponding LESO is:

$$\begin{cases} \dot{z} = Ax + Bu + L(y - \hat{y}) \\ \hat{y} = Cz \end{cases} \quad (8)$$

wherein, $C = [1\ 0\ 0]$, and $L = [L_1 L_2 L_3]^T$ is an error feedback control gain matrix of the observer;

a characteristic equation of the formula (8) is:

$$\lambda(s) = |sI - (A - LC)| \quad (9)$$

after parameterization, a pole of the characteristic equation is designed as follows:

$$\lambda(s) = (s + w_0)(s + k_0 w_0)(s + k_2 w_0) \quad (10)$$

where $w_o$ is a pole of a designed extended state observer, and $k_1$ and $k_2$ are pole placement coefficients of the extended state observer; and a gain matrix of the extended state observer is obtained as follows:

$$L = \begin{bmatrix} (k_1 + k_2 + 1)w_0 \\ (k_1 + k_2 + k_1 k_2)w_0^2 \\ (k_1 k_2)w_0^3 \end{bmatrix}; \quad (11)$$

in step 3.2, the LSEF adopts a controller of a linear proportional and derivative (PD) combination, $z_1 \to y$, $z_2 \to \dot{y}$; and a control law is:

$$u_0 = k_p(z_c - z_1) - k_d z_2 \quad (12)$$

where, $u_0$ is a final control output, $z_c$ is an expected roll angle, $z_1$ is a roll angle of the vehicle in a current state, and $z_2$ is an angular velocity in roll of the vehicle in the current state;

a closed-loop transfer function is:

$$G(s) = \frac{k_p}{s^2 + k_d s + k_p} \quad (13)$$

where $k_p$ and $k_d$ are controller parameters needing to be designed, and, by selecting the pole of the transfer function of the controller and placing the pole at different positions $w_c$ and $k_3 w_c$, $w_c > 1$, $k_3 > 1$, the controller parameters are obtained as follows:

$$k_p = k_3 w_c^2$$

$$k_d = (k_3 + 1)w_c \quad (14)$$

after parametric design, six parameters to be adjusted in the LADRC are $w_0$, $w_c$, $b_0$, $k_1$, $k_2$, $k_3$ wherein $w_0$ is the pole of the extended state observer, $w_c$ is a pole of the controller, $b_0$ is a control coefficient, $k_1$ and $k_2$ are pole placement coefficients of the extended state observer, and $k_3$ is a pole placement coefficient of the controller.

\* \* \* \* \*